(12) United States Patent
Agrawal et al.

(10) Patent No.: US 7,840,528 B2
(45) Date of Patent: Nov. 23, 2010

(54) SYSTEM AND METHOD FOR INTEGRATING CONTINUOUS SYNCHRONIZATION ON A HOST HANDHELD DEVICE

(75) Inventors: Anish Kumar Agrawal, Kitchener (CA); Michal A. Rybak, Kitchener (CA)

(73) Assignee: Research In Motion Limited, Waterloo (CA)

( * ) Notice: Subject to any disclaimer, the term of this patent is extended or adjusted under 35 U.S.C. 154(b) by 930 days.

(21) Appl. No.: 10/971,321

(22) Filed: Oct. 22, 2004

(65) Prior Publication Data

US 2006/0101082 A1 May 11, 2006

(51) Int. Cl.
*G06F 7/00* (2006.01)
*G06F 17/00* (2006.01)
(52) U.S. Cl. .................. 707/609; 707/610; 707/611; 707/620
(58) Field of Classification Search ............... None
See application file for complete search history.

(56) References Cited

U.S. PATENT DOCUMENTS

| | | | | |
|---|---|---|---|---|
| 5,752,042 A * | 5/1998 | Cole et al. | ........... | 717/173 |
| 5,758,355 A * | 5/1998 | Buchanan | ........... | 707/201 |
| 6,006,274 A * | 12/1999 | Hawkins et al. | ........... | 709/248 |
| 6,125,369 A | 9/2000 | Wu et al. | | |
| 6,601,076 B1 * | 7/2003 | McCaw et al. | ........... | 707/203 |
| 6,650,088 B1 * | 11/2003 | Webb et al. | ........... | 320/115 |
| 6,757,696 B2 * | 6/2004 | Multer et al. | ........... | 707/201 |
| 6,868,451 B1 * | 3/2005 | Peacock | ........... | 709/231 |
| 7,039,656 B1 * | 5/2006 | Tsai et al. | ........... | 707/201 |
| 7,165,041 B1 * | 1/2007 | Guheen et al. | ........... | 705/26 |
| 2002/0194207 A1 * | 12/2002 | Bartlett et al. | ........... | 707/203 |
| 2003/0130984 A1 * | 7/2003 | Quinlan et al. | ........... | 707/1 |
| 2004/0010523 A1 | 1/2004 | Wu et al. | | |
| 2004/0024795 A1 | 2/2004 | Hind et al. | | |

FOREIGN PATENT DOCUMENTS

WO   WO 02/23330 A2   3/2002

OTHER PUBLICATIONS

Chinese Office Action; Application No. 200510114082.3; State Intellectual Property Office of People's Republic of China; Feb. 5, 2010, 2 pages.
European Search Report; European Patent Office; Mar. 9, 2005; 6 pages.
Canadian Office Action; Application No. 2,522,477; Canadian Intellectual Property Office; Aug. 12, 2009, 7 pages.

* cited by examiner

*Primary Examiner*—Khanh B Pham
*Assistant Examiner*—Azam Cheema
(74) *Attorney, Agent, or Firm*—The Danamraj Law Group, P.C.

(57) ABSTRACT

A handheld device includes a host database having first and second API associated therewith, a client database and a notification handler. The notification handler sends a request for notification of a change in the host database to the first API and receives the notification of the change in the host database after the change has occurred in the host database. The notification handler then requests contents of the host database from the second API and requests contents from the client database. These contents are then compared by the notification handler to identify the change in the host database. The notification handler then sends a command to update the client database based upon the change in the host database such that changes made in the host database of the handheld device may be continuously synchronized with the user's desktop computer via a wireless communication network.

28 Claims, 3 Drawing Sheets

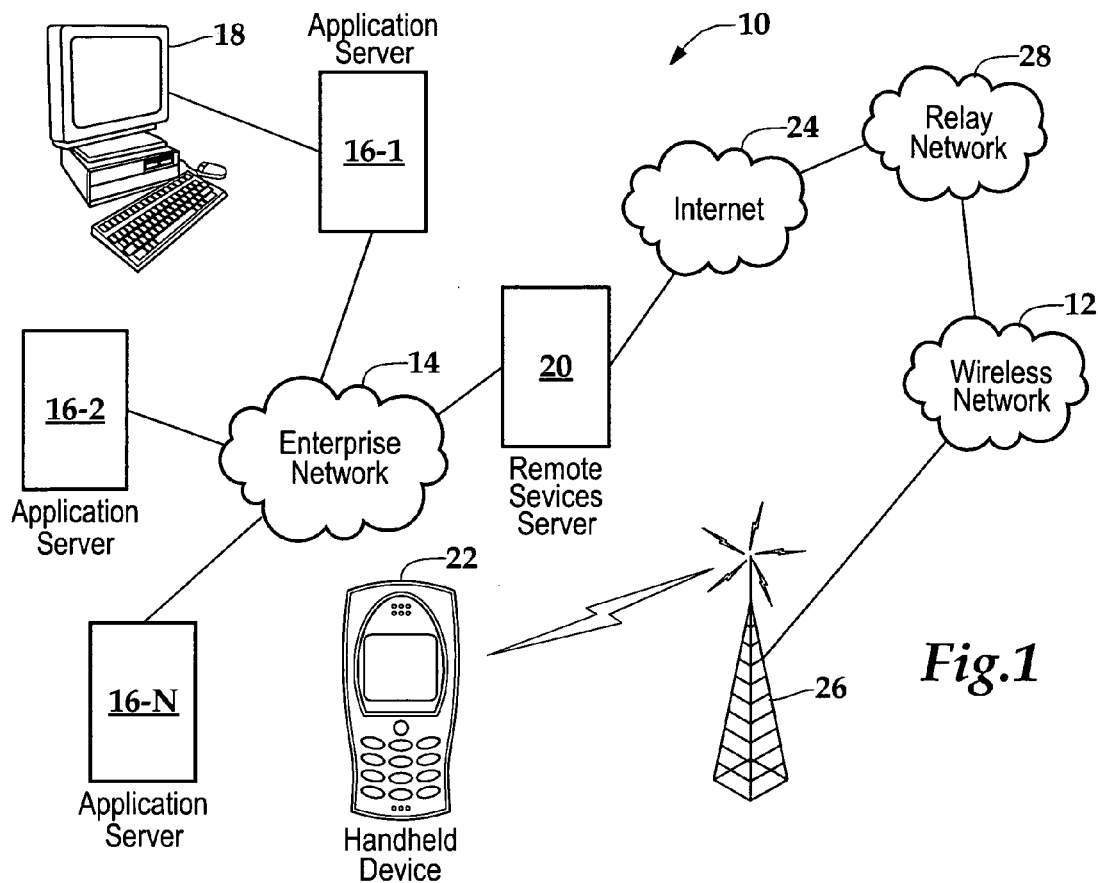
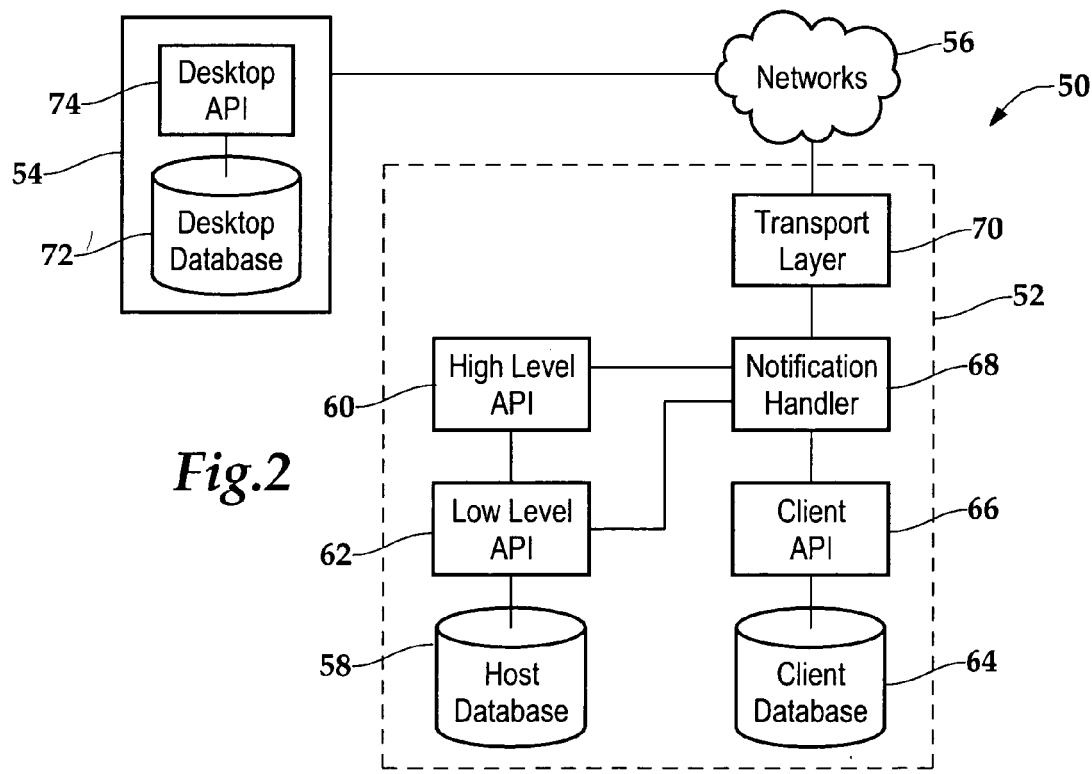
Fig.1
Fig.2

SYSTEM AND METHOD FOR INTEGRATING CONTINUOUS SYNCHRONIZATION ON A HOST HANDHELD DEVICE

TECHNICAL FIELD OF THE APPLICATION

The present application relates, in general, to the integration of a client into a host handheld device and, in particular, to a system and method for integrating a continuous synchronization client on a host handheld device which identifies changes in a host database within the host handheld device and updates a client database in response to the identified changes.

BACKGROUND

Many handheld devices may be synchronized with a desktop computer, that is, information is transferred between the desktop computer and the handheld device to update each. This process typically occurs by coupling the handheld device to the desktop computer via a wired connection and executing synchronization software. Some of these handheld devices may also be capable of wireless synchronization with the desktop computer by establishing wireless communication therebetween and executing the synchronization software. It has been found, however, that these handheld devices are not capable of continuous synchronization to update the information stored on the desktop computer when changes are made to the information stored on the handheld device. Therefore, a need has arisen for a system and method for implementing continuous synchronization from the handheld device to the desktop computer.

SUMMARY

The present application discloses a handheld held device for use in a wireless communications network enabled for continuous synchronization with the user's desktop computer. The handheld device including a host database having first and second API associated therewith, a client database and a notification handler module. The notification handler module sends a request for notification of a change in the host database to the first API. After a change has occurred in the host database, the notification handler module receives notification of the change in the host database from the first API. The notification handler module then requests the contents of the host database from a second API and requests the contents from a client database to compare these contents such that the change in the host database may be identified. The notification handler module then sends a command to update the client database based upon the change in the host database. Once the client database has been updated, the handheld device may communicate with the desktop computer via the wireless communication network to update the desktop computer database based upon the updated client database.

In one embodiment, the record in which the change in the host database has been made is identified by the first API. In this embodiment, the notification handler module requests the contents of this record in the host database from the second API and requests the contents related to the record in which the change was made in the host database from the client database such that the contents of the records can be compared and the record in the client database can be updated.

In one embodiment, the change in the host database may be a change in a calender record. In another embodiment, the change in the host database may be a change in a contacts record. In a further embodiment, the change in the host database may be a change in a task record.

In one embodiment, the change in the host database may be deleted information in the host database. In another embodiment, the change in the host database may be created information in the host database. In a further embodiment, the change in the host database may be updated information in the host database. In yet another embodiment, the change in the host database may be a new record in the host database. In this embodiment, additional fields may be added to the new record and stored in the client database in association with the information contained in the record.

In another aspect, the present application is directed to a method for updating a client database within a handheld device to enable continuous synchronization. The method includes sending a request for notification of a change in a host database to a first API, receiving the notification of the change in the host database after the change has occurred in the host database, requesting contents of the host database from a second API, requesting contents from a client database, comparing the contents of the host database and the client database, identifying the change in the host database and updating the client database based upon the change in the host database.

BRIEF DESCRIPTION OF THE DRAWINGS

For a more complete understanding of the features and advantages of the present systems and methods, reference is now made to the detailed description along with the accompanying figures in which corresponding numerals in the different figures refer to corresponding parts and in which:

FIG. 1 depicts an exemplary network environment including a host handheld device wherein an embodiment of the present application may be practiced;

FIG. 2 depicts an exemplary software architecture of a host handheld device within a wireless communication environment wherein an embodiment of the present patent application may be practiced;

DETAILED DESCRIPTION

Figure 3:
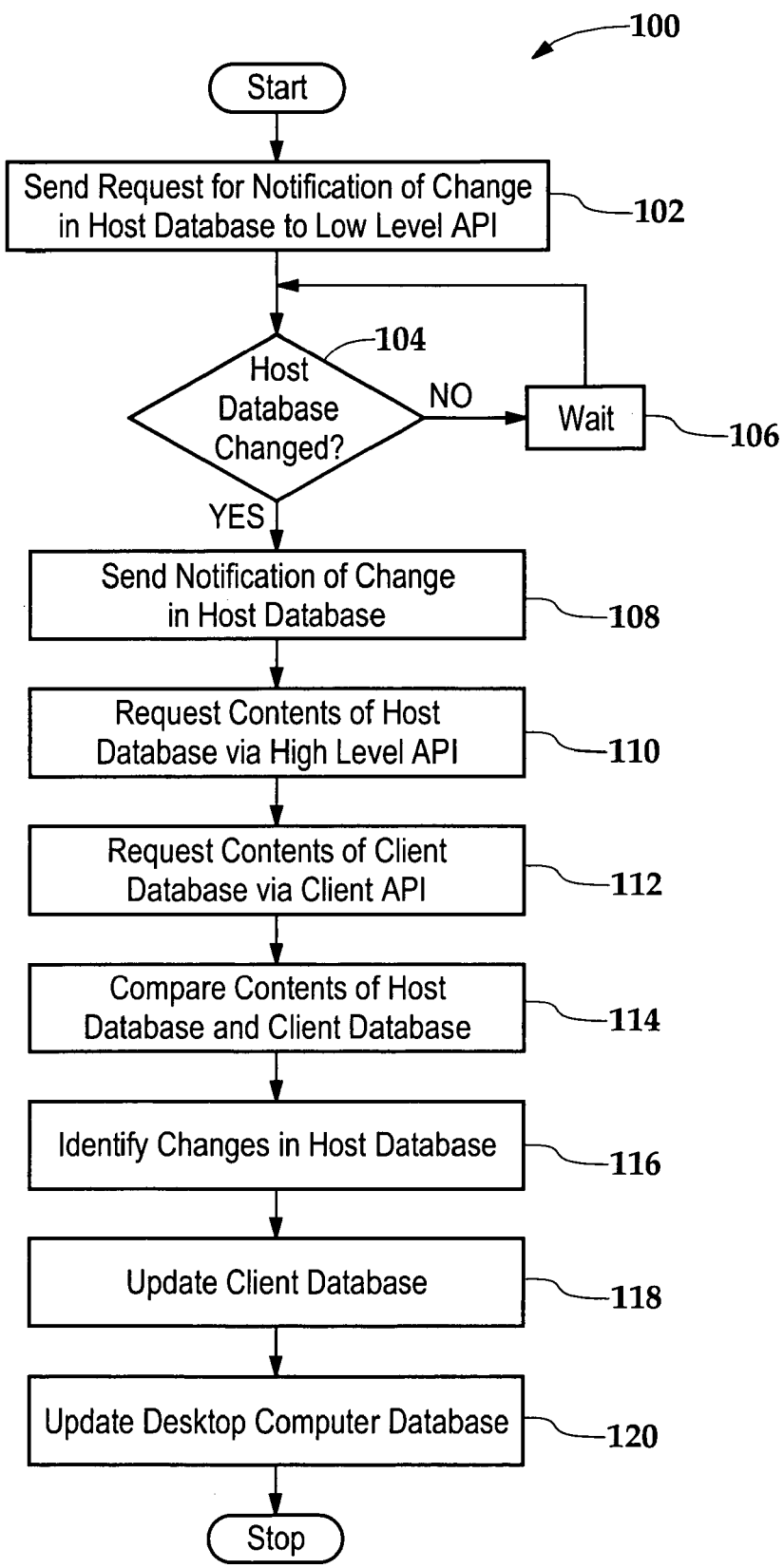
FIG. 3 is a flowchart of an embodiment of integrating a continuous synchronization client on a host handheld device.

While the operation of various embodiments of a handheld device is discussed in detail below, it should be appreciated that the present application provides many applicable inventive concepts which can be embodied in a wide variety of specific contexts. The specific embodiments discussed herein are merely illustrative of specific ways to use the handheld device, and do not delimit the scope of the present application.

Referring initially to FIG. 1, depicted therein is an exemplary network environment 10 including a wireless packet data service network 12 wherein an embodiment of the present patent application may be practiced. An enterprise network 14, which may be a packet-switched network, can include one or more geographic sites and be organized as a local area network (LAN), wide area network (WAN), metropolitan area network (MAN) or the like for serving a plurality of corporate users. A number of application servers 16-1 through 16-N disposed as part of the enterprise network 14 are operable to provide or effectuate a host of internal and external services such as email, video mail, Internet access, corporate data access, messaging, calendaring and scheduling, information management and the like. Accordingly, a diverse array of personal information appliances such as desktop computers, laptop computers, palmtop computers and the like, which are generically and collectively referred to herein and depicted as desktop computer 18, may be operably networked to one or more of the application servers 16-*i*, where i=1, 2, . . . , N, with respect to the services supported in enterprise network 14.

Additionally, a remote services server 20 may be interfaced with enterprise network 14 for enabling a corporate user to access or effectuate any of the services from a remote location using a suitable handheld device 22. A secure communication link with end-to-end encryption may be established that is mediated through an external IP network, i.e., a public packet-switched network such as the Internet 24, as well as the wireless packet data service network 12 operable with handheld device 22 via suitable wireless network infrastructure that includes a base station 26. In one embodiment, a trusted relay network 28 may be disposed between Internet 24 and the infrastructure of wireless packet data service network 12. By way of example, handheld device 22 may be a data-enabled handheld device capable of receiving and sending voice, text messages, web browsing, interfacing with corporate application servers and the like.

For purposes of the present patent application, the wireless packet data service network 12 may be implemented in any known or heretofore unknown mobile communications technologies and network protocols, as long as a packet-switched data service is available therein for transmitting packetized information. For instance, the wireless packet data service network 12 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 12 may comprise an Enhanced Data Rates for GSM Evolution (EDGE) network, an Integrated Digital Enhanced Network (IDEN), a Code Division Multiple Access (CDMA) network, any 3rd Generation (3G) network or the like.

Referring next to FIG. 2, an exemplary software architecture for enabling continuous synchronization of a handheld device in a wireless communication network is illustrated and generally designated 50. Handheld device 52 is in wireless communication with desktop computer 45 via networks 56 which generically and collectively represent the end-to-end connection created, for example, by base station 26, wireless packet data service network 12, trusted relay network 28, Internet 24, remote services server 20, enterprise network 14 and application server 16 as described with reference to FIG. 1. Handheld device 52 is preferably a two-way wireless communication device having at least voice and data communication capabilities. Depending on the exact functionality provided, the handheld device 52 may be referred to as a data messaging device, a two-way pager, a wireless e-mail device, a cellular telephone with data messaging capabilities, a wireless Internet appliance or a data communication device, as examples.

Handheld device 52 preferably includes a microprocessor which controls the overall operation of handheld device 52. The microprocessor interacts with various subsystems of handheld device 52 including communication subsystems, user interface subsystems, memory subsystems and the like as well as other subsystems known to those skilled in the art. The microprocessor preferably enables execution of software applications on handheld device 52. A predetermined set of applications that control basic operations, including at least data and voice communication applications for example, will normally be installed on handheld device 52 during manufacturing. For example, handheld device 52 preferably includes a native personal information manager (PIM) application having the ability to organize and manage information relating to, for example, calender information, task information, contacts information and the like.

Typically, the native PIM application would have the ability to send and receive data items via a wired or wireless connection to synchronized and updated with the user's corresponding data items stored or associated with desktop computer 54 when prompted by the user to synchronize. The illustrated native PIM application includes a host database 58 for storing the information, a high level API 60 for accessing the information stored in host database 58 and a low level API 62 for managing the information stored in host database 58. This configuration alone, however, does not allow for continuous synchronization with desktop computer 54 but instead, would require the user to initiate the synchronization process.

In the illustrated embodiment, handheld device 52 serves as a host device such that a client application may be added onto the host to supplement, supplant or otherwise perform functionality that the host normally would not be capable of performing. In the present case, the native configuration of handheld device 52 does not allow for continuous synchronization with desktop computer 54 such that changes made in host database 58 are not updated in desktop computer 54 without user intervention. By adding a client synchronization application, however, this functionality is achieved. Specifically, the client synchronization application includes a client database 64 for storing a mirror image or enhanced mirror image of the information stored in the host database. The client synchronization application also includes a client API 66 for accessing and managing client database 64 and a notification handler module 68 that controls the acquisition, processing and duplication of information between host database 58 and client database 64 as explained in greater detail below.

To achieve continuous wireless synchronization, the client synchronization application interfaces with a multilayer transport stack 70 that is operable to provide a generic data transport protocol for any type of data via a reliable, secure and seamless continuous connection to a wireless packet data service network. In one implantation, transport stack 70 includes a bottom layer (Layer 1) that is operable as an interface to the wireless network's packet layer. Layer 1 handles basic service coordination within the exemplary network environment 56. For example, when handheld device 52 roams from one carrier network to another, Layer 1 verifies that the packets are relayed to the appropriate wireless network and that any packets that are pending from the previous network are rerouted to the current network. The top layer (Layer 4) of transport stack 70 exposes various application interfaces such as the client synchronization application to the services supported on handheld device 52. The remaining two layers, Layer 2 and Layer 3, are responsible for datagram segmentation/reassembly and security, compression and routing, respectively.

Notification handler module 68 provides an interface between the native PIM application and the client synchronization application and in some embodiments partially or completely disables the native synchronization functionality. Specifically, and with reference to FIG. 3, the operations controlled by notification handler module 68 are described in process 100. The process begins with notification handler module 68 sending an interrupt type request to low level API 62 for notification of a change in host database 58 (block 102). The request is sent to low level API as high level API 60 is unable to receive and respond to such interrupt type requests. Once the request has been sent, if no change is made to the information stored in host database 58, no action is taken by either notification handler module 68 or low level API 62 with respect to the request (block 106). If a change, such as a deletion, an update or an insertion to an existing record, the creation of a new record or the deletion of an entire record, is made to the information in host database 58, low level API 62 sends a notification of the change in host database 58 which is received by notification handler module 68 (block 108).

Notification handler module 68 now send a request to high level API 60 for the contents of host database 58 (block 110) and a request to client API 66 for the contents of client database 64 (block 112). It is noted that notification handler module 68 must request the contents of host database 58 from high level API 60 as low level API is unable to receive and respond to such a request. The contents of these two databases 58, 64 are then compared to one another by notification handler module 68 (block 114) such that notification handler module 68 may identify what change has been made in host database 58 (block 116). Once notification handler module 68 determines what change has occurred in host database 58, notification handler module 68 provides this information to client database 64 such that the contents of client database 64 will again mirror the contents of host database 58 (block 118). Once client database 64 has been updated, the continuous connection between handheld device 52 and desktop computer 54 via networks 56 allows desktop database 72 to be updated using desktop API 74 (block 120).

Importantly, in addition to simply updating client database 64 with the changes made to the information in host database 58, when the change made in host database 58 is a new record, in one embodiment, notification handler module 68 adds additions fields to the new record which are stored in association with the new record in client database 64. For example, the additional fields may be useful or required to achieve the continuous synchronization capability over networks 56.

Figure 4:
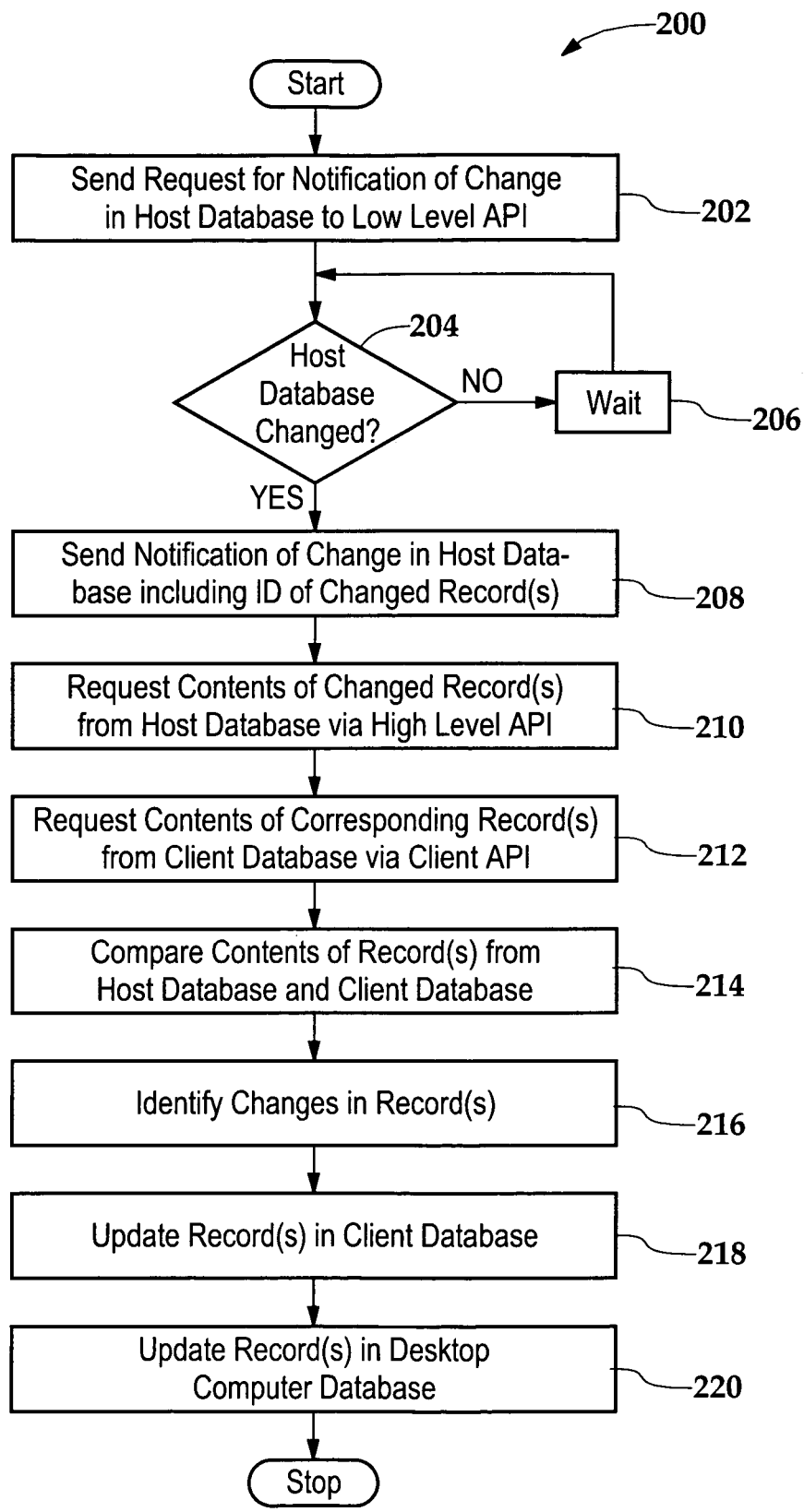
FIG. 4 is a flowchart of another embodiment of integrating a continuous synchronization client on a host handheld device.

Another implementation of the client synchronization application on a host handheld device will now be described with reference to FIG. 4 and process 200. The process begins with notification handler module 68 sending an interrupt type request to low level API 62 for notification of a change in host database 58 (block 202). As before, the request is sent to low level API as high level API 60 is unable to receive and respond to such interrupt type requests. Once the request has been sent, if no change is made to the information stored in host database 58, no action is taken by either notification handler module 68 or low level API 62 with respect to the request (block 206). If a change, such as a deletion, an update or an insertion to an existing record, the creation of a new record or the deletion of an entire record, is made to the information in host database 58, low level API 62 sends a notification of the change in host database 58 which includes the record ID of the record in which the change in made. The notification is received by notification handler module 68 (block 208).

Notification handler module 68 now send a request to high level API 60 for the contents of the changed record of host database 58 (block 210) and a request to client API 66 for the contents of any corresponding record in client database 64 (block 212). As before, notification handler module 68 must request the contents of the changed record from high level API 60 as low level API is unable to receive and respond to such a request. The contents of these two records are then compared to one another by notification handler module 68 (block 214) such that notification handler module 68 may identify what change has been made in the record (block 216). Once notification handler module 68 determines what change has occurred, notification handler module 68 provides this information to client database 64 such that the contents of the effected record in client database 64 are updated and client database 64 again mirrors the contents of host database 58 (block 218). Once client database 64 has been updated, the continuous connection between handheld device 52 and desktop computer 54 via networks 56 allows desktop database 72 to be updated using desktop API 74 (block 220).

While this application has described a mobile device with reference to illustrative embodiments, this description is not intended to be construed in a limiting sense. Various modifications and combinations of the illustrative embodiments as well as other embodiments of the mobile device, will be apparent to persons skilled in the art upon reference to the description. It is, therefore, intended that the appended claims encompass any such modifications or embodiments.

What is claimed is:

1. A method for updating a client database within a host handheld device to enable continuous synchronization, the method comprising:
   sending a request for notification of a change in a host database to a first application program interface (API);
   receiving the notification of the change in the host database after the change has occurred in the host database;
   requesting contents of the host database from a second API;
   requesting contents from the client database;
   comparing the contents of the host database and the contents of the client database;
   identifying the change in the host database; and
   updating the client database based upon the change in the host database, wherein the sending, receiving, requesting, comparing, identifying and updating are performed by a notification handler on the host handheld device.

2. The method as recited in claim 1 wherein receiving the notification of the change in the host database after the change has occurred in the host database further comprises identifying a record in which the change occurred.

3. The method as recited in claim 2 wherein requesting contents of the host database from a second API further comprises requesting contents of the record in which the change occurred.

4. The method as recited in claim 3 wherein requesting contents from a client database further comprises requesting contents related to the record in which the change occurred in the host database.

5. The method as recited in claim 1 further comprising wireless updating a desktop computer database based upon the updated client database.

6. The method as recited in claim 1 wherein receiving the notification of the change in the host database after the change has occurred in the host database further comprises receiving the notification of the change in a calender record.

7. The method as recited in claim 1 wherein receiving the notification of the change in the host database after the change has occurred in the host database further comprises receiving the notification of the change in a contacts record.

8. The method as recited in claim 1 wherein receiving the notification of the change in the host database after the change has occurred in the host database further comprises receiving the notification of the change in a task record.

9. The method as recited in claim 1 wherein receiving the notification of the change in the host database after the change has occurred in the host database further comprises receiving the notification of deleted information in the host database.

10. The method as recited in claim 1 wherein receiving the notification of the change in the host database after the change has occurred in the host database further comprises receiving the notification of created information in the host database.

11. The method as recited in claim 1 wherein receiving the notification of the change in the host database after the change has occurred in the host database further comprises receiving the notification of updated information in the host database.

12. The method as recited in claim 1 wherein sending a request for notification of a change in a host database to a first API further comprises sending a request for notification of a change in a host database to a low level API and wherein requesting contents of the host database from a second API further comprises requesting contents of the host database from a high level API.

13. The method as recited in claim 1 wherein receiving the notification of the change in the host database after the change has occurred in the host database further comprises receiving the notification of a new record in the host database.

14. The method as recited in claim 13 wherein updating the client database based upon the change in the host database further comprises adding the new record to the client database and adding additional fields in association with the new record in the client database.

15. A handheld device comprising:
   means for sending a request for notification of a change in a host database to a first API;
   means for receiving the notification of the change in the host database after the change has occurred in the host database;
   means for requesting contents of the host database from a second API;
   means for requesting contents from a client database;
   means for comparing the contents of the host database and the contents of the client database;
   means for identifying the change in the host database; and
   means for updating the client database based upon the change in the host database.

16. The handheld device as recited in claim 15 wherein the means for receiving the notification of the change in the host database after the change has occurred in the host database further comprises means for identifying a record in which the change occurred.

17. The handheld device as recited in claim 16 wherein the means for requesting contents of the host database from a second API further comprises means for requesting contents of the record in which the change occurred.

18. The handheld device as recited in claim 17 wherein the means for requesting contents from a client database further comprises means for requesting contents related to the record in which the change occurred in the host database.

19. The handheld device as recited in claim 15 further comprising means for wireless updating a desktop computer database based upon the updated client database.

20. The handheld device as recited in claim 15 wherein the means for receiving the notification of the change in the host database after the change has occurred in the host database further comprises means for receiving the notification of the change in a calender record.

21. The handheld device as recited in claim 15 wherein the means for receiving the notification of the change in the host database after the change has occurred in the host database further comprises means for receiving the notification of the change in a contacts record.

22. The handheld device as recited in claim 15 wherein the means for receiving the notification of the change in the host database after the change has occurred in the host database further comprises means for receiving the notification of the change in a task record.

23. The handheld device as recited in claim 15 wherein the means for receiving the notification of the change in the host database after the change has occurred in the host database further comprises means for receiving the notification of deleted information in the host database.

24. The handheld device as recited in claim 15 wherein the means for receiving the notification of the change in the host database after the change has occurred in the host database further comprises means for receiving the notification of created information in the host database.

25. The handheld device as recited in claim 15 wherein the means for receiving the notification of the change in the host database after the change has occurred in the host database further comprises means for receiving the notification of updated information in the host database.

26. The handheld device as recited in claim 15 wherein the means for sending a request for notification of a change in a host database to a first API further comprises means for sending a request for notification of a change in a host database to a low level API and wherein the means for requesting contents of the host database from a second API further comprises means for requesting contents of the host database from a high level API.

27. The handheld device as recited in claim 15 wherein the means for receiving the notification of the change in the host database after the change has occurred in the host database further comprises means for receiving the notification of a new record in the host database.

28. The handheld device as recited in claim 27 wherein the means for updating the client database based upon the change in the host database further comprises means for adding the new record to the client database and adding additional fields in association with the new record in the client database.

* * * * *